United States Patent [19]

Mayer

[11] Patent Number: 4,630,907

[45] Date of Patent: Dec. 23, 1986

[54] APPARATUS FOR PIVOTALLY MOUNTING A FILM MAGAZINE TO A MOTION PICTURE CAMERA

[75] Inventor: Albert L. Mayer, Tarzana, Calif.

[73] Assignee: Panavision, Inc., Tarzana, Calif.

[21] Appl. No.: 817,001

[22] Filed: Jan. 8, 1986

[51] Int. Cl.$^4$ .............................................. G03B 23/02
[52] U.S. Cl. ..................................... 352/75; 352/243
[58] Field of Search ...................... 352/72, 75, 76, 243

[56] References Cited

U.S. PATENT DOCUMENTS 4,082,436 4/1978 Gottschalk ............................ 352/72

Primary Examiner—Monroe H. Hayes
Attorney, Agent, or Firm—Lyon & Lyon

[57] ABSTRACT

An apparatus for pivotally mounting a film magazine to a motion picture camera which enables the film magazine to be slidably pivoted from a position wherein the film magazine is mounted substantially on top of the camera to a position wherein the film magazine is mounted substantially on the rear of the camera. Light shield means are provided to close off the adjustment aperture in the motion picture camera housing which permits the slidable pivoting motion. Brake means are provided for securing the mounting bracket in the selected pivoted position. Extraneous light is prevented from entering the motion picture camera by light securing members mounted between the camera body and the flexible light shield members.

16 Claims, 9 Drawing Figures

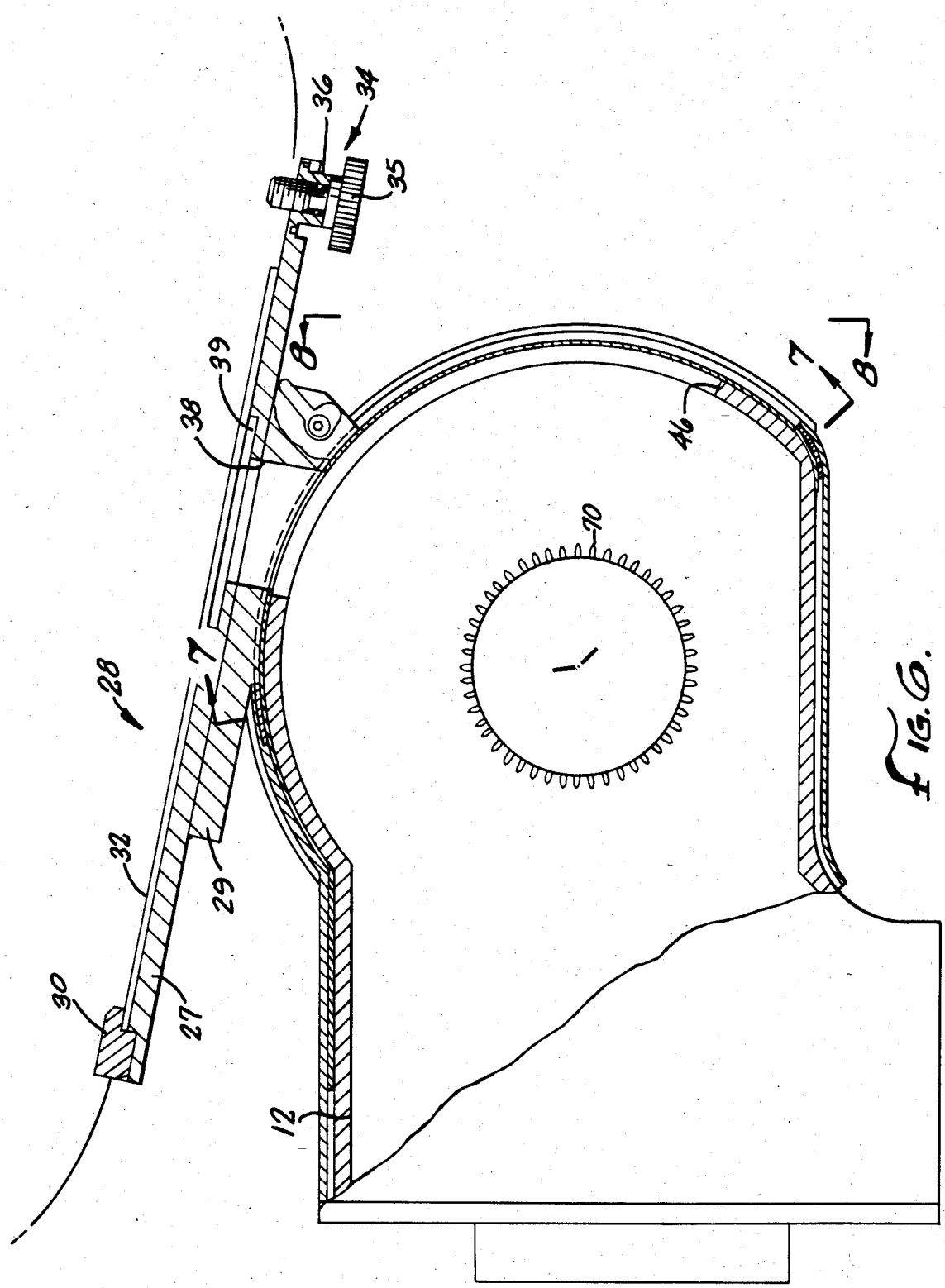

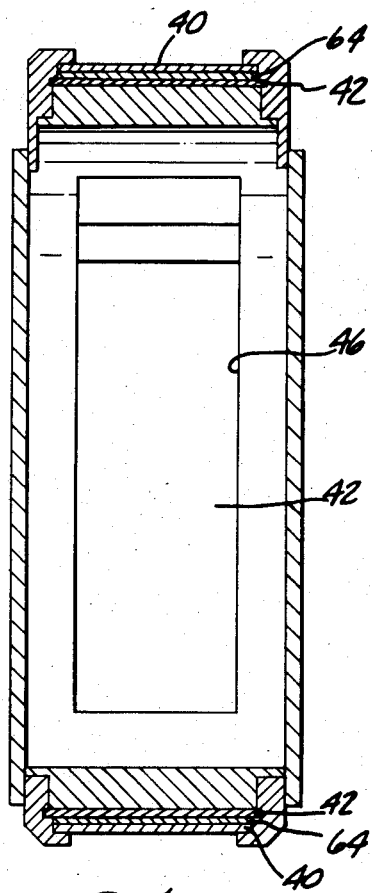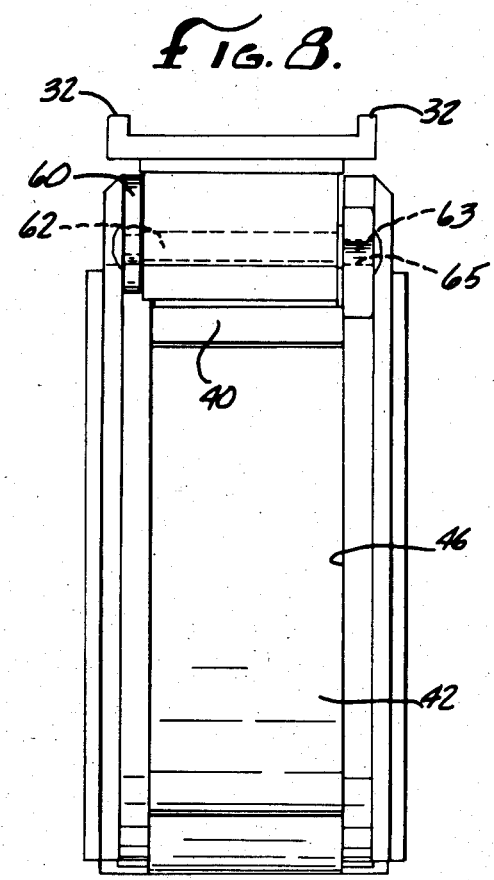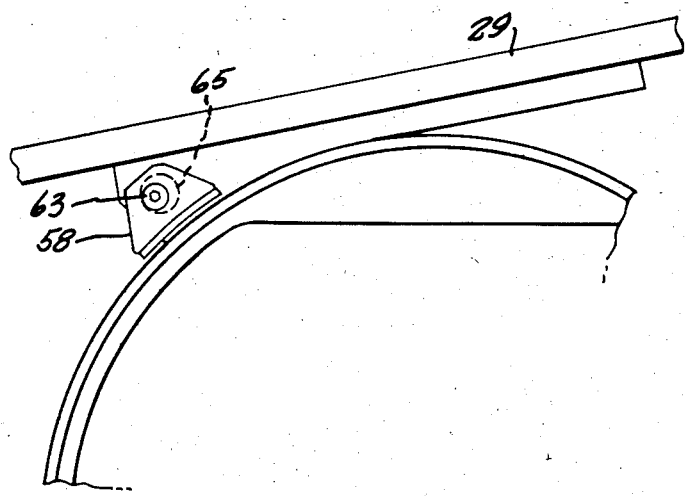

APPARATUS FOR PIVOTALLY MOUNTING A FILM MAGAZINE TO A MOTION PICTURE CAMERA

The present invention relates to a motion picture camera and, more particularly, to an apparatus for slidably pivoting a film magazine about a motion picture camera, which camera may be operated at high speed.

As is known in the art, when operating a motion picture camera, and particularly when such a camera is operated at high speed, it is desirable to maintain a uniform tension on the film strip leaving the supply reel. An example of an apparatus for maintaining such a condition is set forth in Gottschalk, et al., U.S. Pat. No. 4,418,994 (1983), the disclosure of which is hereby incorporated in full herein by reference.

Traditionally, motion picture cameras have been mounted on a tripod or some other rigid and secure surface. In such a configuration, it is desirable to mount the film magazine on the upper surface or the top of the camera so as to enhance the stability of the completed camera assembly. In more contemporary times, however, it has been recognized that it is also desirable to be able to have the same motion picture camera carried by an individual.

Accordingly, cinematic technology expanded to meet the artistic demands imposed by modern film makers and a shoulder mounted motion picture camera was introduced. An example of such a motion picture camera is set forth in Gottschalk, U.S. Pat. No. 4,121,886 (1978), the disclosure of which is hereby incorporated in full herein by reference. In order to increase the stability of such a motion picture camera configuration, the film magazine was mounted at the rear or on the back of the camera. Such a set-up provided the user of the camera a convenient means to counterbalance the weight of the camera lenses and the like, typically mounted on the front of the camera.

Further advancement of cinematic technology has resulted in newer and lighter weight cameras and lens assemblies. In addition, there has been a concomitant expansion of the demands placed on motion picture cameras by users of same. As such, a need exists for providing an adjustable means by which the position of the film magazine may be varied on the camera between being mounted fully upright on the camera top and fully rearward on the camera back. Such a device would enable the user of the camera and film magazine to compensate for the individual characteristics of the motion picture camera, the particular lenses being used, and the motion picture camera user, including things such as the size and weight distribution of each, all while maintaining the flexibility to use the camera in the conventional tripod mounted or shoulder supported configurations.

The present invention is an apparatus for slidably pivotally mounting a film magazine to a motion picture camera. A mounting bracket having an aperture therethrough is provided for connection to the film magazine. The aperture is arranged such that the film may pass through it and into the body of the camera for exposure. A platform is connected to the lower portion of the mounting bracket, and has a flange formed on the base thereof. A flexible light shield extends from both the front and the rear of the platform flange.

A second and larger adjustment aperture is formed in the camera body. The adjustment aperture extends substantially about the arcuate portion of the camera body from the top to the back of the camera. Light sealing means are provided between the flexible light shield guide means of the camera body and the flexible light shield in order to prevent extraneous light from intruding into the interior of the camera.

As such, it is an object of the present invention to provide an apparatus whereby a film magazine may be slidably pivoted about a motion picture camera housing.

It is a further object of the present invention to provide an apparatus wherein the position of the film magazine relevant to the camera body may be varied anywhere between being fully upright and being fully rearwardly attached to the camera body.

It is a further object of the present invention to provide a means whereby the mounting apparatus may be releasably retained in a selected position.

It is a further object of the present invention to provide an apparatus to pivotally connect a film magazine to a motion picture camera wherein light is substantially prevented from entering the camera interior through the sliding pivotal connection. Other and more detailed objects of the present invention shall become apparent from the following description and the accompanying drawings of a preferred embodiment, wherein:

FIG. 6 is a partial cross-sectional side view of the present invention with the magazine positioned for the camera to be connected to a tripod mount;

FIG. 7 is a cross-sectional view taken substantially along lines 7—7 of FIG. 6;

FIG. 8 is an end view shown substantially along line 8—8 of FIG. 6; and,

FIG. 9 is a partial side view showing the magazine position brake means.

Figure 1:
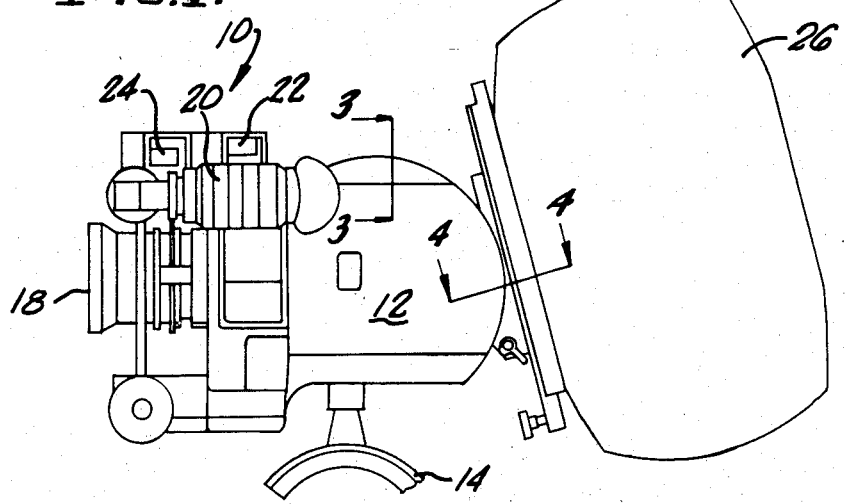
FIGS. 1 and 2 are side elevations showing the preferred form of the invention, the camera and its related parts and accessories being adapted to be positioned on a shoulder in FIG. 1 and positioned on a tripod mount in FIG. 2.
Figure 2:
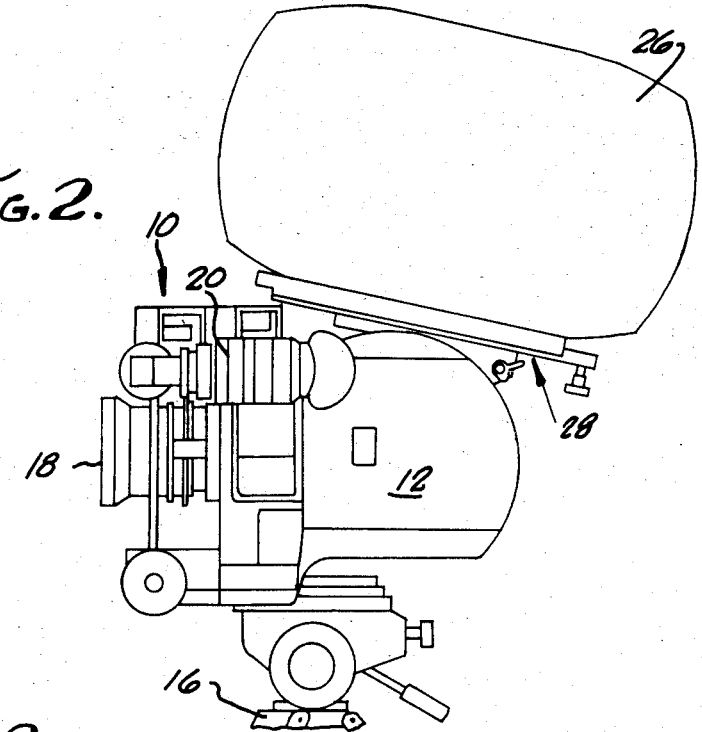
Figure 3:
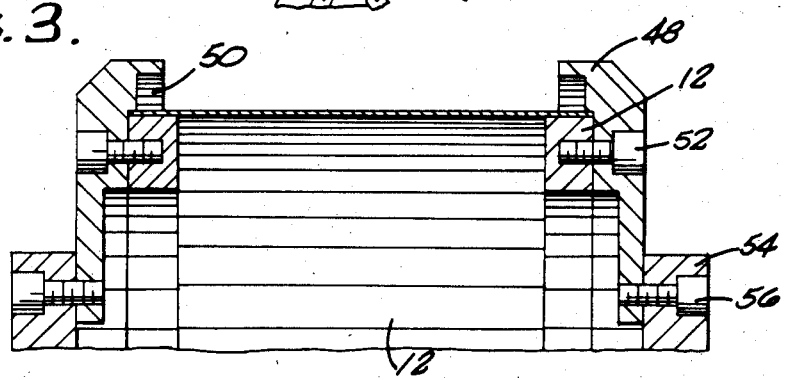
FIG. 3 is a cross-sectional view taken substantially along line 3—3 of FIG. 1.
Figure 4:
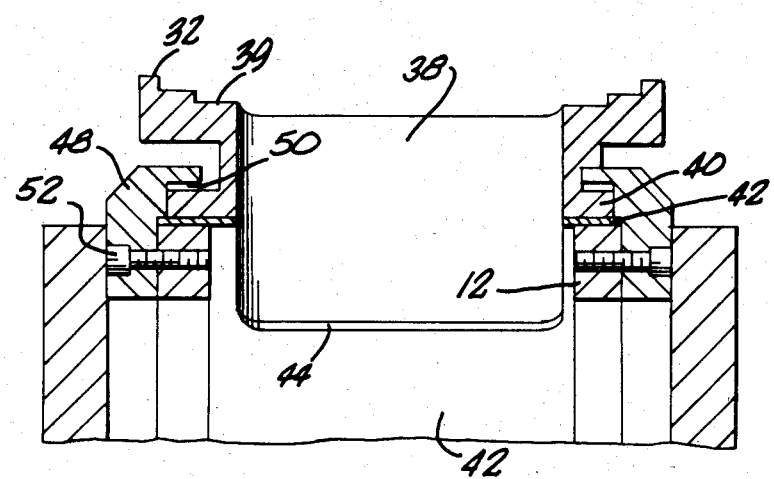
FIG. 4 is a cross-sectional view of the present invention shown substantially along line 4—4 of FIG. 1.

Referring to the Figures, a motion picture camera, designated generally as 10, includes a housing or body 12 which may be supported on a shoulder mount 14 or a tripod 16 as illustrated in FIGS. 1 and 2, respectively. An interchangeable lens assembly 18 is mounted at the forward or front end of the camera housing 12 together with a view finder assembly 20, a film speed indicator 22 and a film footage meter 24. The film is contained within a film magazine 26 which supplies and collects film for use in connection with the motion picture camera 10. As such, any mounting apparatus connecting the film magazine 26 to the motion picture camera housing 12 must be arranged so as to permit film to pass therebetween.

A mounting bracket 28 for connection to a film magazine 26 includes an upper bracket portion 27 and a lower platform portion 29. The upper bracket portion 27 has a mounting shoe 30 connected to the front thereof and alignment side rails 32 integrally formed thereon. Securing means 34 are provided for selectively rigidly interconnecting the film magazine 26 and the upper bracket portion 27 of the mounting bracket 28. In the preferred embodiment, the securing means 34 includes a screw means 35 extending through the mounting bracket 28. In addition, a spring bias means 36 acts to maintain the screw means 35 in the mounting bracket 28 when the securing means 34 is not in use.

An aperture 38 is formed through both the upper bracket portion 27 and lower platform portion 29 of the mounting bracket 28. A recessed shoulder 39 is formed about the aperture 38 in the upper bracket portion 27 of the mounting bracket 28.

At the base of the lower platform portion 29 of the mounting bracket 28 is a curvilinear flange 40 which, in the preferred embodiment, extends out from the sides and to the rear of the lower platform portion 29 of the mounting bracket 28. A flexible light shield 42 having an aperture 44 therethrough is connected to the base of the flange 40. For purposes of example only, it is expected that the flexible light shield 42 in the preferred embodiment of the present invention will be constructed from a thin spring steel.

Figure 5:
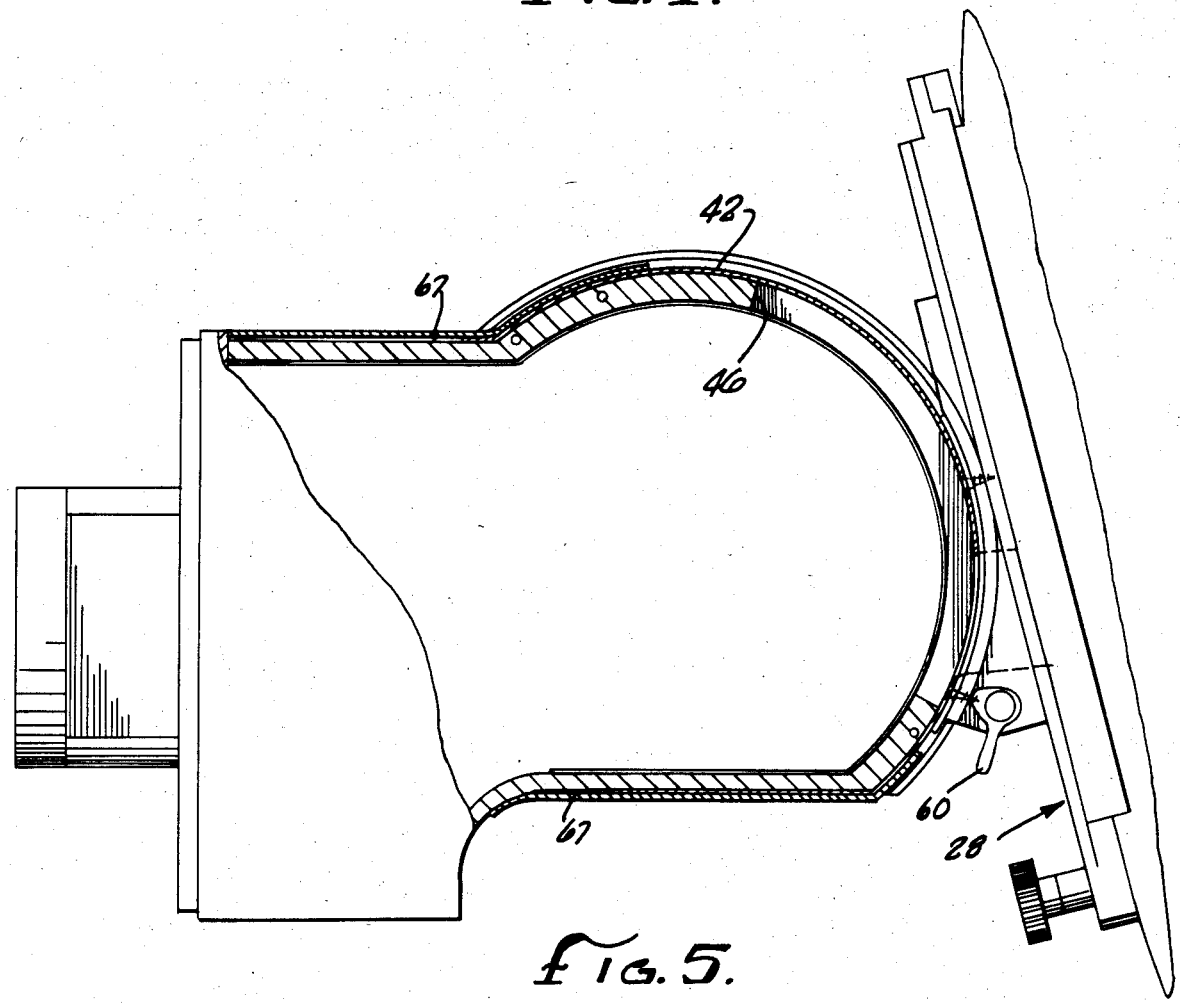
FIG. 5 is a partial cross-sectional side view of the present invention with the magazine positioned for the camera to be attached to a shoulder mount.

A second and larger curvilinear adjustment aperture 46 is formed in the motion picture camera housing or body 12. The adjustment aperture 46 extends substantially from the top of the motion picture camera housing 12 to the rear of the motion picture camera housing 12 as is best shown in FIGS. 5 and 6. Curvilinear sides 48 having a curvilinear track 50 formed therein are attached to the housing 12 through connection means 52. A protecting cover 54 is connected to the camera sides 48 through connecting means 56.

A brake shoe 58 is positioned on one side of the lower platform portion 29 of the mounting bracket 28 and above the top of at least one of the curvilinear sides 48. An actuation lever 60 is located on the other side of the lower platform portion 29 of the mounting bracket 28. The brake shoe 58 is actuated through a rotation shaft 62 and a cam 63 connected thereto which acts in a hollow 65 in the cam member 63, thereby applying a substantially downward force on the brake shoe 58 upon rotation of the actuation lever 60. In this manner the magazine 26 may be locked in any desired position by operating the lever 60.

When in the assembled condition, the aperture in the light shield 44 is aligned substantially with the aperture 38 in the mounting bracket 28. In addition, the flexible light shield 42 and the flange member 40 are positioned so as to ride in the curvilinear track 50 formed in the sides 48. So arranged, it is possible to slidably pivot the mounting bracket 28 about the motion picture camera housing 12 from a position where the film magazine 26 is mounted substantially on the top of the motion picture camera 10 (as shown in FIG. 2) to a position where the film magazine is mounted substantially on the rear of the motion picture camera 10 (as shown in FIG. 1). In addition, the film magazine may be selectively positioned at any point therebetween, thereby allowing the user of the camera to adjust to position of the film magazine depending on the characteristics of the camera, the lens, the proportion of film on the respective reels, and the cameraman, as well as the demands on the film maker and the situation at hand.

Extraneous light is excluded from the camera interior by the flexible light shield 42 which acts to cover the portion of the adjustment aperture 46 which is not covered by the curvilinear flange 40 of the lower portion 29 of the mounting bracket 28. A slot 67 is provided in the camera body at each end of the adjustment aperture 46 for receiving the shield 42. Light securing members 64 of a black felt-like material are positioned between the camera body housing 12 and the flexible light shield 42 in the slot 67 at each end of the adjustment aperture 46 to prevent light from entering into the camera interior therebetween. Additionally, in order to avoid any unnecessary reflection, the interior of the motion camera body 12 is lined with the same black felt-like material which is used to construct the light securing members 64.

The mounting bracket 28 and an attached film magazine 26 may be secured in its selected position by actuating the actuation lever 60, thereby engaging brake shoe 58 with the curvilinear side member 48. Similarly, to slidably pivot the mounting bracket 28 and an attached film magazine 26, brake shoe 58 is released through actuation lever 60, thereby permitting the slidable pivoting motion to occur with the flexible light shield 42 being progressively withdrawn at one end from the light securing slot member 67 at that end and being progressively inserted into the light securing slot member 67 at the other end. The film loop from the magazine 26 extends through the apertures 38 and 46 into the camera 12 with one side of the film loop passing on one side of and being engaged by the sprocket 70 and the other side of the film loop engaging the other side of the sprocket 70, in a conventional manner as shown for example in U.S. Pat. No. 4,121,886. The curvilinear track 50 is preferably formed as a portion of a circle having its center at the center of rotation of the film sprocket 70 whereby the shifting of the magazine along the track does not cause any substantial change in the lengths of the two sides of the film loop passing into the camera from the magazine.

The embodiment of the invention described hereinabove is intended for purposes of example only and should not be construed to limit the scope of the claims appended hereto.

I claim:

1. An apparatus for mounting a motion picture film magazine to a motion picture camera body, the apparatus comprising, a mounting bracket, said mounting bracket having an aperture therethrough, means to attach a first side of said mounting bracket to the film magazine, an adjustment aperture formed in the motion picture camera body, flexible light shield means having an aperture therethrough and being connected to a second side of said mounting bracket, said flexible light shield means being arranged so as to be slidable within said adjustment aperture and being further arranged such that said aperture in said flexible light shield means is aligned substantially with said aperture in said mounting bracket, and means to releaseably lock said mounting bracket in a selected position.

2. A mounting apparatus as set forth in claim 1 wherein said means to releaseably lock said mounting bracket includes a brake shoe which may be selectively engaged with the motion picture camera body.

3. A mounting apparatus as set forth in claim 1 wherein said second side of said mounting bracket has a flange formed thereon, said flange being arranged so as to be engaged with the camera body and slidable within said adjustment aperture.

4. A mounting apparatus for connecting a motion picture camera film magazine to a motion picture camera body, the apparatus comprising, a mounting bracket, said mounting bracket including an alignment shoulder and having an aperture therethrough, said aperture being arranged to permit film to pass therethrough, an adjustment aperture formed in a curvilinear portion of the camera body, flexible light shield means, said flexible light shield means being arranged so as to be slidable within said adjustment aperture, said flexible light shield means further having an aperture therethrough, said flexible light shield means being connected to a curvilinear flange on said mounting bracket such that said flexible light shield aperture is aligned substantially with said mounting bracket aperture and means to releaseably lock said mounting bracket in a selected position.

5. A mounting apparatus as set forth in claim 4 wherein light sealing means are positioned between said slidable flexible light shield and said camera body.

6. In a motion picture camera, said camera having a body with sides and having a portion which is substantially curvilinear, the improvement comprising, an adjustment aperture being formed through said curvilinear portion of said camera body, a flexible light shield means, said flexible light shield means be arranged so as to be engaged with said camera body and slidable within said adjustment aperture, said flexible light shield having an aperture therethrough, a mounting bracket connected to said flexible light shield means, said mounting bracket having an aperture therethrough, said mounting bracket aperture being aligned substantially with said aperture in said light shield means, means to retain said mounting bracket in a selected position and means to connect said mounting bracket to the camera film magazine.

7. An apparatus for movably mounting a film magazine on a motion picture camera comprising, a track means on said camera with a film aperture extending along said track means, magazine support means for supporting the film magazine and mounted on said track means for movement along said track means for changing the position the film magazine relative to the camera, said magazine support means including an aperture through which the film passes into the camera through said film aperture and means for retaining said magazine support means in a selected position on said track means.

8. The apparatus of claim 7 wherein said magazine support means has means movable therewith for covering all of said film aperture except a portion adjacent the said aperture in said magazine support means.

9. The apparatus of claim 7 wherein said means for retaining said magazine supports means in a selected position includes a selectively operable locking means.

10. The apparatus of claim 7 wherein said track means is of a length and shape extending from a top portion of the camera to a rear portion of the camera for allowing selective movement of the film magazine from a position on top of the camera to a position on the rear of the camera and to any intermediate position.

11. The apparatus of claim 10 wherein said track means is of a curvilinear shape rotating the orientation of the magazine on the camera from generating horizontal on the top of the camera to generally vertical on the rear of the camera.

12. The apparatus of claim 11 wherein the film magazine is lower in the rear position than in the top position.

13. The apparatus of claim 10 wherein said magazine support means has means movable therewith for covering all of said film aperture except a portion adjacent the said aperture in said magazine support means.

14. The apparatus of claim 13 wherein said track means is of a curvilinear shape and said movable means includes a thin spring steel light shield mounted on said magazine support means and positioned in said track means.

15. The apparatus of claim 14 wherein means are provided on the camera at each end of the track means for receiving the spring steel light shield and excluding light from the camera.

16. The apparatus of claim 15 wherein said means for retaining said magazine support means in a selected position includes a selectively operable locking means.

* * * * *